UNITED STATES PATENT OFFICE.

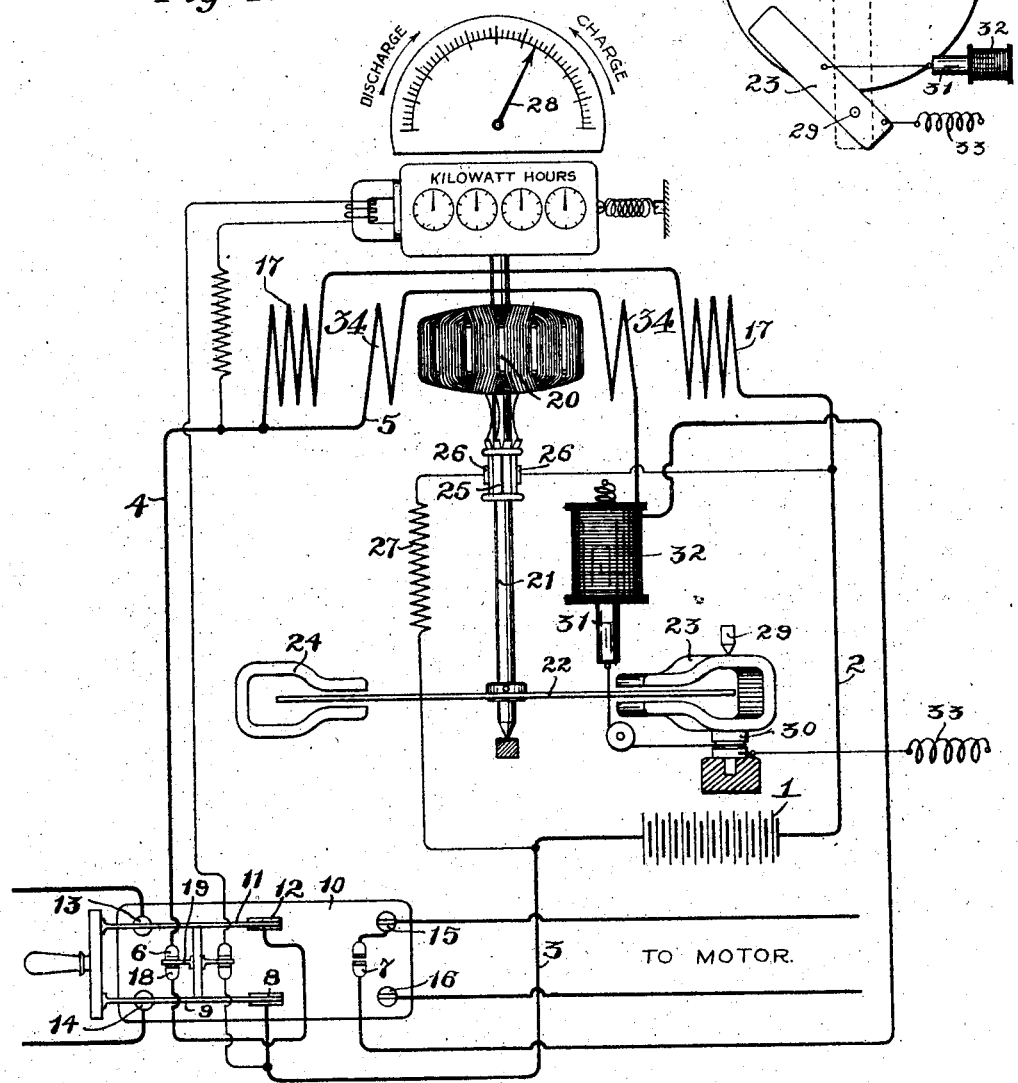

THOMAS DUNCAN, OF CHICAGO, ILLINOIS.

ELECTRICAL MEASURING INSTRUMENT.

No. 796,055.   Specification of Letters Patent.   Patented Aug. 1, 1905.

Application filed August 26, 1901. Renewed January 7, 1905. Serial No. 239,978.

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawings, forming a part of this specification.

My invention relates to meters adapted for use in connection with storage batteries, and has for its object the provision of a meter that is adapted to rotate at different speeds per unit of load or energy upon variations in the rate of battery-discharge.

By means of my invention the meter is caused to operate at an increased rate of speed per unit of load or energy upon an increase in the rate of discharge.

In the use of storage batteries it is well known that the output of the battery will always be less than the energy stored therein and that the battery loss will increase upon a sufficient increase in the rate of battery discharge. For example, (supposing the battery to be a one hundred-volt battery,) if the battery is charged one hundred thousand watt-hours at its normal rate—say ten thousand watts for ten hours—the total discharge at the same rate which can be made available without harm to the battery will not be more than about eighty per cent. of the energy charged into the battery with some makes of battery, this battery loss varying with different makes—that is, the battery will effectively operate at one hundred amperes for eight hours, giving out eight hundred ampere-hours (equivalent to eighty thousand watt-hours of energy) after having received one thousand ampere-hours, (equivalent to one hundred thousand watt-hours.) If the rate of discharge is increased, the total output will be diminished. For example, with certain makes of battery the energy discharged will not be over about seventy per cent. if the rate is increased to one hundred and forty amperes, sixty per cent. if the rate of discharge is doubled, and forty per cent. if the rate of discharge is quadrupled.

I have provided an instrument that is adapted to compensate for the varying battery losses due to the varying rates of discharge, so that the user of the battery may know when the available energy in the battery is spent. Ordinarily a meter associated with a storage battery that is discharged at varying rates will indicate the presence of more energy in the battery than actually exists. The meter of my invention is also adapted to measure the energy that is being stored in the battery, the meter when thus associated with the charging source of current being operatively dissociated from the means that cause the meter to operate at varying rates of speed per unit of load or energy at different rates of discharge.

In my present invention I employ a bodily-movable magnet preferably associated with the damping-disk, more or less of the disk being included in the field of the magnet to properly modify the speed of the meter. I employ an electromagnet whose winding is included in series with the storage battery for governing the position of the braking-magnet, the controlling-magnet by being in series with the battery varying in strength with the varying battery discharges. The magnet, which is preferably permanent to produce a field of permanently-uniform strength, is preferably pivoted so as to be readily adjustable.

I will explain my invention more fully by reference to the accompanying drawings, in which—

Figure 1 illustrates a storage-battery system with a meter constructed in accordance with my invention associated therewith. Fig. 2 is a view of a modified form of means for controlling the position of a braking-magnet.

Like parts are indicated by similar characters of reference in both views.

A storage battery 1 is illustrated, having mains 2 and 3. The main 2 is provided with bifurcated branches 4 and 5, terminating in contacts 6 and 7, while the main 3 terminates in a pivotal mounting 8, upon which a switch-blade 9 of a switch 10 is secured. A second switch-blade 11 of the switch 10 is also placed upon a pivotal mounting 12. Terminals 13 and 14 of a charging-circuit are illustrated. Terminals 15 and 16 of conductors leading to translating means are also illustrated.

When the switch 10 is thrown to the left, the charging machine or source of current is thrown in circuit with the storage battery, and the circuit may be traced from one terminal 14, through the switch-blade 9, pivotal mounting 8, battery lead or main 3, the storage battery, the main 2, the meter-winding 17, the branch conductor 4, the contacts 18, engaged by a supplemental blade 19 when the switch 10 is thrown to the left, pivotal mounting 12, the blade 11, to the terminal 13.

When the switch is thrown to the right, the storage battery is in connection with the translating means and the meter. The circuit may then be traced from the terminal or contact 16 to the switch-blade 9, pivotal mounting 8, storage-battery main or lead 2, the meter-winding 17, the branch conductor 5, the terminal 7, to the remaining terminal 15 of the translating-circuit, the terminals 7 and 15 being connected by the supplemental switch-blade 19 when the switch is thrown to the right. The current-winding 17 of the meter is subdivided into two coils. The meter is also provided with a pressure-winding 20, included in bridge between the battery leads or mains. These meter-windings are constantly in circuit with the battery, irrespective of its association with the charging-machine or translating means.

The meter-winding 20 is preferably in the form of an armature and is mounted upon a spindle 21, at the lower end of which is provided a damping-disk 22, arranged within the fields of permanent magnets 23 and 24, the meter thus constituting a wattmeter, though I do not wish to be limited to this type of instrument.

The shaft 21 also carries the commutator 25, against which bear the brushes 26 26, that serve to include the armature of the meter in circuit, a choking resistance 27 being also included in circuit with the armature. The meter is provided with gearing at its upper end to actuate the measuring-index 28, which by coöperation with a suitable reading-scale serves to indicate the amount of energy stored in the battery in charging and remaining in the battery in discharging. The magnet 23 is movably mounted, being mounted upon pivot-bearings 29.

In Fig. 1 I have illustrated a drum 30, provided with two winding-cords, one attached to the core 31 of an operating-electromagnet in the form of a solenoid 32, while the other is attached to a spring 33, the electromagnet and spring serving to exert rotary effort upon the drum 30 in opposite directions.

In Fig. 2 a more direct connection between the core of the solenoid and the magnet is illustrated. The winding of the electromagnet 32 is included in the branch conductor 5, whereby this winding is included in circuit with the battery when the battery is included in circuit with the translating means. When the battery is in circuit with the charging source of current, the magnet 32 is out of circuit. When the magnet 32 is out of circuit and the battery is being charged, the spring 33 moves the permanent magnet 23 toward the periphery of the damping-disk, whereby the greatest braking effect that may be produced by said damping-magnet in coöperation with the damping-disk may be secured, so that while the battery is being charged the rate of operation of the meter per unit of load or energy will be decreased to compensate for battery loss. When the battery is in circuit with the translating means, the magnet 32 being energized causes a movement of the magnet 23 toward the center of the disk to decrease the braking effect, and thereby permit an increase in the rate of speed of the meter per unit of load or energy to compensate for battery loss. The electromagnet 32, being placed in series with the storage battery, produces a change in the position of the magnet 23 when a change occurs in the rate of battery discharge. For example, if the rate of current-flow from the battery increases the strength of the magnet 32 correspondingly increases after each corresponding movement of the magnet 23 toward the center of the damping-disk, thereby reducing the load upon the meter. If the rate of current-flow should be decreased, the strength of the magnet 32 would be correspondingly weakened, permitting the spring 33 to effect a corresponding movement of the magnet 23 toward the periphery of the disk to sufficiently increase the braking effect of the magnet 23 to properly decrease the rate of operation of the meter. To secure additional perfection in the operation of the meter, I prefer to include a supplemental current field-winding 34 in the branch conductor 5 that serves to increase the torque of the meter, which by coöperating with the reduced load upon increase in the rate of battery discharge most effectively secures the desired rate of operation. I do not wish to be limited, however, to a meter employing the auxiliary winding 34.

Having thus described my invention, I claim as new and desire to secure by Letters Patent—

1. The combination with a storage battery, of means for connecting the same with a charging source of current or a translating means, a meter receiving current passing through the battery, a magnetic drag including an adjustable permanent magnet, and an operating electromagnetic device in series with the battery and serving to move the braking-magnet to properly modify the rate of operation of the meter per unit of load or energy to compensate for battery loss, substantially as described.

2. The combination with a storage battery, of means for connecting the same with a charging source of current or a translating means, a meter receiving current passing through the battery, a magnetic drag including an adjustable permanent magnet, an operating electromagnetic device in series with the battery and serving to move the braking-magnet to properly modify the rate of operation of the meter per unit of load or energy to compensate for battery loss, and means whereby the operating electromagnetic device is rendered inoperative while the battery is connected with the charging-machine or source of current, substantially as described.

3. The combination with a storage battery, of means for connecting the same with a charging source of current or a translating means, a meter receiving current passing through the battery, a magnetic drag including an adjustable permanent magnet, an operating electromagnetic device in series with the battery and serving to move the braking-magnet to properly modify the rate of operation of the meter per unit of load or energy to compensate for battery loss, and a supplemental field-winding in series with the operating electromagnetic device, substantially as described.

4. The combination with a storage battery, of means for connecting the same with a charging source of current or a translating means, a meter receiving current passing through the battery, a magnetic drag including an adjustable permanent magnet, an operating electromagnetic device in series with the battery and serving to move the braking-magnet to properly modify the rate of operation of the meter per unit of load or energy to compensate for battery loss, means whereby the operating electromagnetic device is rendered inoperative while the battery is connected with the charging-machine or source of current, and a supplemental field-winding in series with the operating electromagnetic device, substantially as described.

5. The combination with a storage battery, of means for connecting the same with a charging source of current or a translating means, a meter receiving current passing through the battery, a magnetic drag including a pivotally-mounted permanent magnet, and an operating electromagnetic device in series with the battery and serving to move the braking permanent magnet to modify the rate of operation of the meter per unit of load or energy to compensate for battery loss, substantially as described.

6. The combination with a storage battery, of means for connecting the same with a charging source of current or a translating means, a meter receiving current passing through the battery, a magnetic drag including a pivotally-mounted permanent magnet, and an operating electromagnetic device in circuit with the battery and serving to move the braking-magnet to properly modify the rate of operation of the meter per unit of load or energy to compensate for battery loss, substantially as described.

7. The combination with a storage battery, of a meter receiving current passing through the battery, a magnetic drag including an adjustable permanent magnet, and an operating electromagnetic device in series with the battery and serving to move the braking-magnet to properly modify the rate of operation of the meter per unit of load or energy to compensate for battery loss, substantially as described.

8. The combination with a storage battery, of a meter receiving current passing through the battery, a magnetic drag including an adjustable permanent magnet, and an operating electromagnetic device serving to move the braking-magnet to properly modify the rate of operation of the meter per unit of load or energy to compensate for battery loss, substantially as described.

9. The combination with a storage battery, of a meter receiving current passing through the battery, a magnetic drag including a pivotally-mounted permanent magnet, and an operating magnetic device serving to move the braking-magnet to modify the rate of operation of the meter, substantially as described.

10. The combination with a storage battery, of means for connecting the same with a charging source of current or a translating means, a meter receiving current passing through the battery, a permanent damping-magnet, and an electromagnetic means in series with the battery serving to move the damping-magnet to modify the rate of operation of the meter per unit of load or energy to compensate for battery loss, substantially as described.

11. The combination with a storage battery, of means for connecting the same with a charging source of current or a translating means, a meter receiving current passing through the battery, an adjustable permanent damping-magnet, and an electromagnetic means serving to move the damping-magnet to modify the rate of operation of the meter per unit of load or energy to compensate for battery loss, substantially as described.

12. The combination with a storage battery, of means for connecting the same with a charging source of current or translating means, and a meter receiving current passing through the battery provided with a pivotally-mounted damping-magnet to modify the rate of operation of the meter per unit of load or energy to compensate for battery loss, substantially as described.

In witness whereof I hereunto subscribe my name this 16th day of August, A. D. 1901.

THOMAS DUNCAN.

Witnesses:
GEORGE L. CRAGG,
HERBERT F. OBERGFELL.